UNITED STATES PATENT OFFICE.

ROBERT J. SISK, OF NEW LONDON, CONNECTICUT.

COMPOSITION FOR SIZING WALLS.

SPECIFICATION forming part of Letters Patent No. 530,557, dated December 11, 1894.

Application filed April 18, 1894. Serial No. 507,964. (No specimens.)

*To all whom it may concern:*

Be it known that I, ROBERT J. SISK, a citizen of the United States, residing in the city and county of New London and State of Connecticut, have invented a new and useful Composition of Matter to be Used for Sizing Walls Preparatory to Applying Paper to the Same, of which the following is a specification.

The object of this invention is to produce a composition which, being applied to plaster or white-washed walls previously to papering the same, will provide a coating for such walls to which the paper will readily adhere and which will also prevent the white-wash from flaking off.

My composition consists of the following ingredients, combined in substantially the proportions stated, viz:—Water, twenty-five gallons; molasses, eighteen gallons; sugar, seventy-five pounds; glue, fifty pounds; alcohol, one quart; boracic acid, two pounds; oil of sassafras, one-half pint; oil of mirbeau, one-half pint.

In the preparation of my newly invented size the water, molasses, sugar and glue are first placed in a suitable vessel and boiled until thoroughly commingled. The boracic acid, alcohol, oil of sassafras and oil of mirbeau are then added and the various ingredients of the compound are finally thoroughly mingled by agitation, when it is ready for use or for the market.

The oils of sassafras and mirbeau are used simply as deodorizers and are not absolutely necessary to the successful working of my said compound, but I preferably use them.

The boracic acid serves as a preservative.

Instead of using both molasses and sugar, the same strength of saccharine matter may be obtained by using all molasses or all sugar, but for economic purposes, I find that the use of each in the described quantities gives most satisfactory results.

My described size, when about to be used, should be reduced by adding three parts of pure water to one part of the size and may then be applied to the wall by a brush in the ordinary manner.

What I claim, and desire to secure by Letters Patent of the United States, is—

The herein described composition of matter for "paper hangers' size," consisting of water, saccharine matter, glue, alcohol, boracic acid, oil of sassafras and oil of mirbeau, in substantially the proportions specified.

ROBERT J. SISK.

Witnesses:
JOHN C. GEARY,
RALPH H. DENISON.